June 16, 1959     C. D. P. SMALLPEICE     2,890,770
DEVICE FOR RETARDING MOVEMENT OF A MEMBER
Filed Jan. 7, 1957
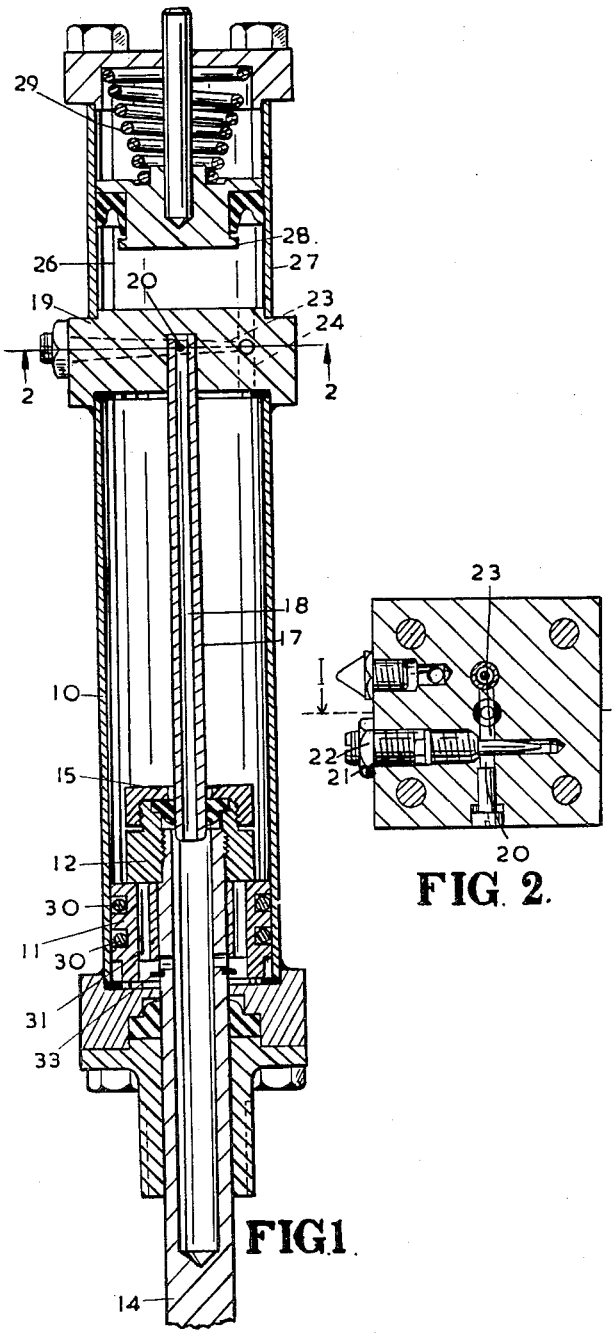
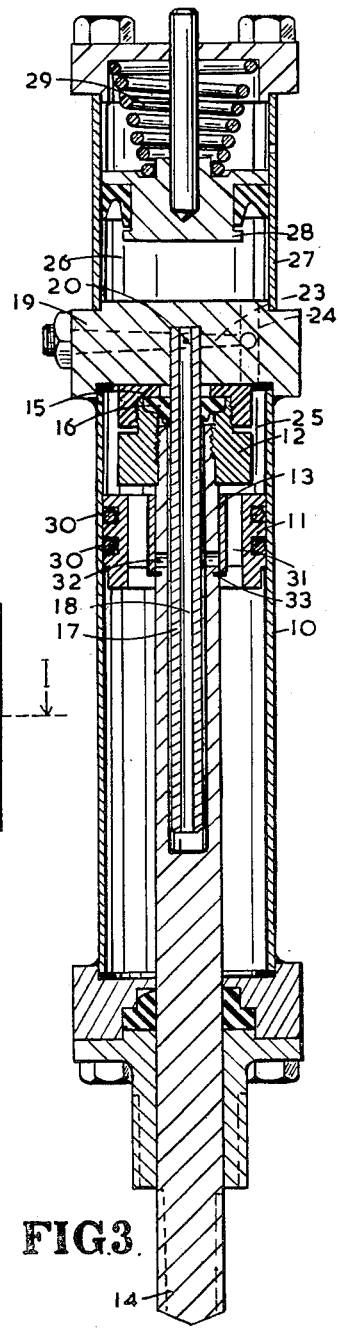
INVENTOR
C. D. P. SMALLPEICE

United States Patent Office 2,890,770
Patented June 16, 1959

2,890,770

DEVICE FOR RETARDING MOVEMENT OF A MEMBER

Cosby Donald Philipps Smallpeice, Swanwick Shore, near Southampton, England

Application January 7, 1957, Serial No. 632,900

1 Claim. (Cl. 188—96)

This invention relates to a device for retarding movement of a member.

According to the invention, the device comprises a fluid-containing cylinder and a partially-hollow piston rod carrying a piston reciprocable in the cylinder; the piston, or the piston rod, including an orifice through which fluid can pass into the interior of the hollow piston rod, the hollow piston rod being slidable on an internally fixed concentric tube, one end of the tube communicating with the interior of the partially-hollow piston rod and the other end of the tube being connected through a variable orifice to the interior of one end of said cylinder, whereby, during piston movements, in one direction at least, fluid can flow from the part of the cylinder at one end of the piston through said orifice into the interior of the piston rod and thence through said fixed tube and said variable orifice into the part of the cylinder at the other end of said piston.

If desired, the device can be made a one-way retarding device, for example, by forming the piston in two parts, one of the parts having limited axial sliding movement on said piston rod so that in one direction of movement of the piston said one part covers said orifice in the piston rod, said one part having an axial channel to provide free flow of fluid from one side of the piston to the other during piston movement in said one direction, the arrangement being such that in the other direction of piston movement the two parts abut and seal thus bringing into operation the retarding effect.

The member to be retarded may be, for example, a slide of a machine-tool, and it may be connected, directly or indirectly, to the piston rod, or an extension thereof.

If desired, the cylinder can include, at one end, a reservoir having one wall spring-loaded so as to compress fluid within the reservoir, whereby the fluid tends to flow into the cylinder to compensate for losses of fluid and for any differences in the areas of the ends of the pistons.

One embodiment of the invention is described in the accompanying single sheet of drawings, in which:

Figure 1 is an axial section through a piston and cylinder arrangement, showing the piston in one position;

Figure 2 is a cross-section on line 2—2 of Figure 1, and

Figure 3 corresponds with Figure 1 but shows the piston in another position.

In the drawing, a cylinder 10 has slidable in it a piston comprising two parts 11 and 12, part 12 being screwed onto a partially-hollow piston rod 13 on which the piston part 11 is slidably mounted.

Screwed on to the piston part 12 is an end portion 15 and between the parts 12 and 15 is trapped a resilient sealing member 16 which is slidable on a fixed tube 17 having an internal bore 18.

Tube 17 is supported at one end by a block 19 which comprises a variable orifice 20 (Figure 2), controllable by a screwed plug 21 having locking nut 22. A passage 23 connects the orifice 20 with a bore 24. The bore 24 has one end connected to the portion 25 of cylinder 10 and the other end connected to a fluid reservoir 26 closed by a cylindrical wall 27 and piston 28.

The piston 28 is biassed by spring 29 so as to exert a constant pressure on the fluid contained in the reservoir 26 thus forcing the fluid 24 into the cylinder 10 to compensate for the difference in areas of the end faces of the piston parts 11 and 12, and to compensate for any fluid loss.

The slide of the machine will be connected to an extension 14 of the piston rod 13.

The piston part 11 has two sealing rings 30 and includes an axial bore 31. The piston rod 14 includes an orifice 32 and carries an abutment 33 to limit sliding movement of the piston part 11.

In operation, as the piston rod 13 moves from its upper position, shown in Figure 3 to its lower position, shown in Figure 1, fluid pressure causes the two parts 11 and 12 of the piston to abut and seal thus leaving the aperture 32 uncovered. Fluid will flow from the lower part of cylinder 10 through the aperture 32 into the interior of the hollow piston part 13 and thence through the bore 18 in tube 17 and into the variable orifice 20. Fluid then flows through the passage 23 into the bore 24 and thence into the upper end 25 of the cylinder 10.

By varying the position of the screwed plug 21 the variable orifice can be altered to change the degree of retardation applied to the extension 14 to piston rod 13.

When the piston moves from its lower position, shown in Figure 1 to its upper position shown in Figure 3, the piston part 11 moves relatively downwardly to the piston part 12 until the piston part 11 contacts the abutment 33 and therefore closes the orifice 32. In this position the variable orifice 20 is cut off and fluid can flow directly from the upper part of cylinder 10 through the axial bore 31 into the lower part of cylinder 10 without any substantial retardation.

In the embodiment shown, the retarding device is unidirectional, but by making two piston parts 11 and 12 integral and omitting bore 31, the retarding device can be made to operate in both directions of movement of the piston.

What I claim as my invention and desire to secure by Letters Patent of the United States is:

A one-way retarding device, for a machine tool slide, comprising a cylinder, for containing a fluid, having end walls, a piston rod reciprocably extending through one end wall, said piston rod having a coaxial bore open at the end inside the cylinder, a coaxial tube with one end extending with radial clearance into said coaxial bore and having the other end fixed to the other end wall of the cylinder, a radially extending piston, of a smaller diameter than that of the cylinder, carried by the end of the piston rod inside the cylinder, an inwardly extending resilient sealing member supported by said radially extending piston for providing a reciprocatory seal between the coaxial bore and the coaxial tube, a free floating piston part slidably supported by the piston rod and peripherally sealing with the bore of the cylinder, at least one axial bore extendnig through the piston part, said axial bore being within the diameter of the piston, and the piston and the piston part being so arranged that when the piston part abuts the piston the axial bore is sealed, said piston rod having a radial aperture extending from the coaxial bore and providing a fluid communication between said one end of the cylinder and the coaxial bore, a stop extending radially from the piston rod on the side of the radial aperture remote from the piston, said other end wall of the cylinder provided with an orifice establishing a communication between the bore of the coaxial tube and the said other end of the cylinder, means for varying the effective area of said orifice, the piston part being so arranged that when the piston rod moves towards said other end of said cylinder said piston part abuts said stop and seals the radial aperture and unseals the axial bore so as to allow fluid to move from said other end of the cylinder through the axial bore to said one end of the cylinder whereby to allow the piston rod to move freely, the piston part being so arranged that when the piston rod moves towards said one end of said cylinder said piston part uncovers the radial aperture and seals the axial bore whereby to constrain the fluid to move from said one end of the cylinder to said other end of the cylinder through the radial aperture, the coaxial bore, the bore in the coaxial tube, and the variable orifice thus constricting the motion of the fluid and consequently retarding the motion of the piston rod.

References Cited in the file of this patent

UNITED STATES PATENTS

| | | |
|---|---|---|
| 1,956,669 | Charles | May 1, 1934 |
| 2,342,381 | Thornhill | Feb. 22, 1944 |
| 2,778,259 | Moir | Jan. 22, 1957 |

FOREIGN PATENTS

| | | |
|---|---|---|
| 1,054,308 | France | Oct. 7, 1953 |